(12) United States Patent
Rajan

(10) Patent No.: US 9,491,514 B2
(45) Date of Patent: Nov. 8, 2016

(54) MEDIA CONTENT BOOKMARKING

(71) Applicant: EchoStar Technologies L.L.C., Englewood, CO (US)

(72) Inventor: Venkat Deep Rajan, Atlanta, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 6 days.

(21) Appl. No.: 14/135,113

(22) Filed: Dec. 19, 2013

(65) Prior Publication Data

US 2015/0181300 A1 Jun. 25, 2015

(51) Int. Cl.
| | |
|---|---|
| H04N 5/445 | (2011.01) |
| H04N 7/173 | (2011.01) |
| H04N 21/472 | (2011.01) |
| H04N 21/4788 | (2011.01) |
| H04N 21/432 | (2011.01) |
| H04N 5/775 | (2006.01) |
| H04N 9/82 | (2006.01) |
| H04N 21/258 | (2011.01) |
| H04N 21/2668 | (2011.01) |
| H04N 21/61 | (2011.01) |
| H04N 21/658 | (2011.01) |
| H04N 21/81 | (2011.01) |

(52) U.S. Cl.
CPC ........ *H04N 21/47214* (2013.01); *H04N 5/775* (2013.01); *H04N 9/8205* (2013.01); *H04N 21/25891* (2013.01); *H04N 21/2668* (2013.01); *H04N 21/4325* (2013.01); *H04N 21/4788* (2013.01); *H04N 21/47217* (2013.01); *H04N 21/6143* (2013.01); *H04N 21/6581* (2013.01); *H04N 21/812* (2013.01)

(58) Field of Classification Search
CPC .......... H04N 21/431; H04N 21/2312; H04N 21/472; H04N 21/47217; H04N 21/4788
USPC .............................................. 725/47, 52, 112
See application file for complete search history.

(56) References Cited

U.S. PATENT DOCUMENTS

| | | | | |
|---|---|---|---|---|
| 7,624,337 | B2 * | 11/2009 | Sull ................... | G06F 17/30796 715/201 |
| 8,953,928 | B2 * | 2/2015 | Beacham ........... | H04N 21/4334 386/239 |
| 2006/0080716 | A1 * | 4/2006 | Nishikawa ........ | G06F 17/30849 725/89 |
| 2006/0288273 | A1 * | 12/2006 | Erol .................. | G06F 17/30884 715/203 |
| 2012/0275764 | A1 * | 11/2012 | Eyer .............................. | 386/241 |
| 2013/0151610 | A1 * | 6/2013 | Schoen .................. | G06Q 50/01 709/204 |
| 2014/0064700 | A1 * | 3/2014 | Kaneko .................... | H04N 9/87 386/241 |
| 2014/0068679 | A1 * | 3/2014 | Kaneko et al. .................. | 725/49 |
| 2014/0150040 | A1 * | 5/2014 | Kitahara ............ | H04N 21/4722 725/93 |
| 2014/0196090 | A1 * | 7/2014 | Kataoka ............... | H04N 21/482 725/43 |
| 2014/0255005 | A1 * | 9/2014 | Escamilla ................ | H04N 5/76 386/241 |
| 2015/0086180 | A1 * | 3/2015 | Pan .................. | H04N 21/47214 386/241 |
| 2015/0181300 | A1 * | 6/2015 | Rajan ............... | H04N 21/47214 725/58 |

* cited by examiner

*Primary Examiner* — James R Sheleheda
(74) *Attorney, Agent, or Firm* — Kilpatrick Townsend & Stockton LLP

(57) ABSTRACT

Systems and methods that enable satellite television subscribers to bookmark and annotate sections of recorded media content, and also to share and access bookmarks with and created by others.

20 Claims, 9 Drawing Sheets

MEDIA CONTENT BOOKMARKING

BACKGROUND

The advent of the digital video recorder and the availability of high-capacity and affordable computer-readable storage devices have made available many possibilities to television programming service providers and viewers alike. In addition, television viewers have come to expect flexibility and convenience with respect to the recording and accessing of recorded content via their television receivers.

SUMMARY

This Summary does not in any way limit the scope of the claimed subject matter.

In an aspect, a television receiver is disclosed. The television receiver may include one or more processors; and a memory communicatively coupled with and readable by the one or more processors and having stored therein processor-readable instructions. The processor-readable instructions, when executed by the one or more processors, may cause the one or more processors to output for presentation by a display device a first user interface that provides an activation item that when selected activates a service for bookmarking recorded media accessible to the television receiver, and an authorization item that when selected authorizes the sharing of particular bookmarks associated with recorded media by the television receiver with a delocalized computer system. The processor-readable instructions, when executed by the one or more processors, may cause the one or more processors to output for presentation by the display device a second user interface that provides a first command item that when selected commands the television receiver to playback particular recorded media without access to bookmarks associated with the particular recorded media, and a second command item that when selected commands the television receiver to playback the particular recorded media with access to bookmarks associated with the particular recorded media.

In an aspect, a method may include receiving, by a television receiver, a command to access a particular bookmark associated with a recording that is accessible to the television receiver, during playback of the recording by the television receiver to a display device. The method may include identifying, by the television receiver, a clip of the recording associated the particular bookmark, wherein a duration of the clip is user-configurable. The method may include outputting, by the television receiver, the clip of the recording associated with the particular bookmark to the display device for presentation thereon.

In an aspect, a method may include outputting by a television receiver to a display device for presentation when an associated command is detected by the television receiver a first user interface that provides an activation item that when selected activates a service for bookmarking recorded media accessible to the television receiver, and an authorization item that when selected authorizes the sharing of particular bookmarks associated with recorded media by the television receiver with a delocalized computer system. The method may include outputting by the television receiver to the display device for presentation when an associated command is detected by the television receiver a second user interface that provides a first command item that when selected commands the television receiver to playback particular recorded media without access to bookmarks associated with the particular recorded media, and a second command item that when selected commands the television receiver to playback the particular recorded media with access to bookmarks associated with the particular recorded media.

DETAILED DESCRIPTION

The present disclosure is directed to or towards systems and methods that enable satellite television subscribers to bookmark and annotate sections of recorded media content, and also to share and access bookmarks with and created by others. Such features may, among other things, serve to entice new customers to subscribe to services as offered by a particular satellite television provider, as well as provide an incentive for existing customers to maintain their loyalty and/or relationship with the particular satellite television provider. Although not so limited, an appreciation of the various aspects of the present disclosure may be gained from the following discussion in connection with the drawings.

Figure 1:
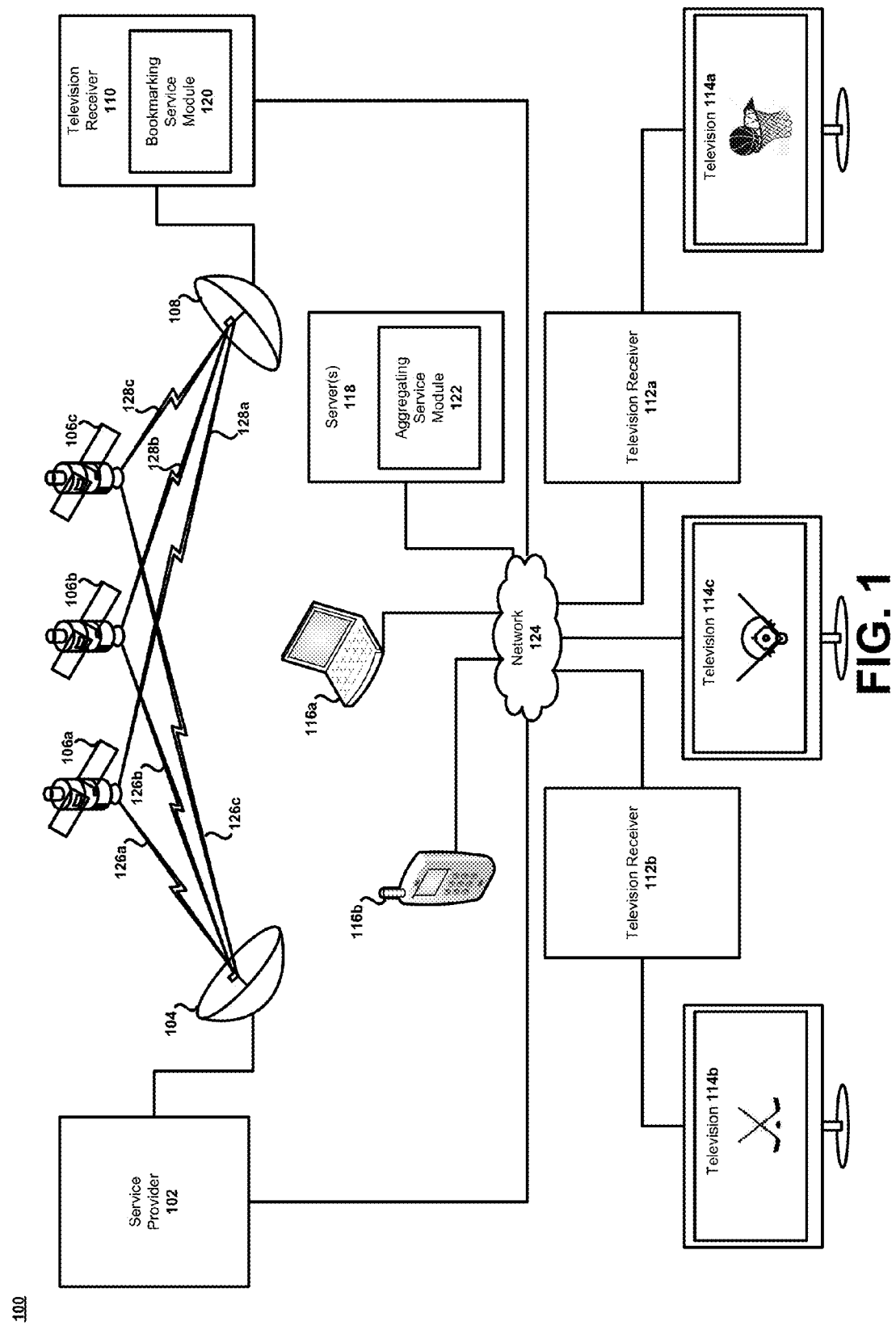
FIG. 1 shows an example satellite system in accordance with the disclosure.

For example, FIG. 1 illustrates an example satellite television distribution system 100 in accordance with the disclosure. For brevity, the system 100 is depicted in a simplified form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of content distribution system as desired.

The example system 100 may include a service provider 102, a satellite uplink 104, a plurality of satellites 106a-c, a satellite dish 108, a PTR (Primary Television Receiver) 110, a plurality of STRs (Secondary Television Receivers) 112a-b, a plurality of televisions 114a-c, a plurality of computing devices 116a-b, and at least one server 118 that may be associated with the service provider 102. Additionally, the PTR 110 may include a bookmarking service module 120, and the server 118 may include an aggregating service module 122.

In general, the bookmarking service module 120 together or in tandem with the aggregating service module 122 may be configured and arranged to implement various features associated with enabling satellite television subscribers to bookmark and annotate sections of recorded media content, and also to share and access bookmarks with and created by others. Such a solution may be beneficial and/or advantageous in many respects. For example, users may share clips or parts of media content with family and friends, as well as with others who they might not know. Further, users can play back and watch certain portions of any piece of media content that might have been flagged by themselves or others as desired. Still further, the present disclosure may simplify recorded content viewing for the device user, and also benefit an entity associated with the service provider 102 in light of targeted advertisements and on-demand viewing based on user interests, as discussed in further detail below. However, other benefits and/or advantages are possible as well, and an appreciation of such benefits and/or advantages may be understood in light of the present disclosure in its entirety.

The system 100 may further include at least one network 124 that establishes a bi-directional communication path for data transfer between and among each respective element of the system 100, outside or separate from the unidirectional satellite signaling path. The network 124 is intended to represent any number of terrestrial and/or non-terrestrial network features or elements. For example, the network 124 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 100.

The PTR 110, and the STRs 112*a-b*, as described throughout may generally be any type of television receiver, television converter, etc., such as a STB for example. In another example, the PTR 110, and the STRs 112*a-b*, may exhibit functionality integrated as part of or into a television, a DVR (Digital Video Recorder), a computer such as a tablet computing device, or any other computing system or device, as well as variations thereof. Further, the PTR 110 and the network 124, together with the STRs 112*a-b* and televisions 114*a-c*, and possibly the computing devices 116*a-b*, may each be incorporated within or form at least a portion of a particular home computing network. Further, the PTR 110 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 100 may be configured to communicate in accordance with the MoCA® (Multimedia over Coax Alliance) home entertainment networking standard. Still other embodiments are possible.

In practice, the satellites 106*a-c* may each be configured to receive uplink signals 126*a-c* from the satellite uplink 104. In this example, each the uplink signals 126*a-c* may contain one or more transponder streams of particular data or content, such as one or more particular television channels, as supplied by the service provider 102. For example, each of the respective uplink signals 126*a-c* may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 106*a-c*.

Further, different media content may be carried using different transponders of a particular satellite (e.g., satellite 106*a*); thus, such media content may be transmitted at different frequencies and/or different frequency ranges. For example, a first and second television channel may be carried on a first carrier frequency over a first transponder of satellite 106*a*, and a third, fourth, and fifth television channel may be carried on second carrier frequency over a first transponder of satellite 106*b*, or, the third, fourth, and fifth television channel may be carried on a second carrier frequency over a second transponder of satellite 106*a*, and etc. Each of these television channels may be scrambled such that unauthorized persons are prevented from accessing the television channels.

The satellites 106*a-c* may further be configured to relay the uplink signals 126*a-c* to the satellite dish 108 as downlink signals 128*a-c*. Similar to the uplink signals 126*a-c*, each of the downlink signals 128*a-c* may contain one or more transponder streams of particular data or content, such as various encoded and/or at least partially electronically scrambled television channels, on-demand programming, etc., in accordance with an allotted carrier frequency and bandwidth. The downlink signals 128*a-c*, however, may not necessarily contain the same or similar content as a corresponding one of the uplink signals 126*a-c*.

For example, the uplink signal 126*a* may include a first transponder stream containing at least a first group or grouping of television channels, and the downlink signal 128*a* may include a second transponder stream containing at least a second, different group or grouping of television channels. In other examples, the first and second group of television channels may have one or more television channels in common. In sum, there may be varying degrees of correlation between the uplink signals 126*a-c* and the downlink signals 128*a-c*, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other embodiments are possible.

Continuing with the example scenario, the satellite dish 108 may be provided for use to receive television channels (e.g., on a subscription basis) provided by the service provider 102, satellite uplink 104, and/or satellites 106a-c. For example, the satellite dish 108 may be configured to receive particular transponder streams, or downlink signals 128a-c, from one or more of the satellites 106a-c. Based on the characteristics of the PTR 110 and/or satellite dish 108, however, it may only be possible to capture transponder streams from a limited number of transponders concurrently. For example, a particular tuner of the PTR 110 may be configured to tune to a single transponder stream from a transponder of a single satellite at a time.

Additionally, the PTR 110, which is communicatively coupled to the satellite dish 108, may subsequently select via tuner, decode, and relay particular transponder streams to the television 114c for display thereon. For example, the satellite dish 108 and the PTR 110 may, respectively, be configured to receive, decode, and relay at least one premium HD-formatted television channel to the television 114c. Programming or content associated with the HD channel may generally be presented live, or from a recording as previously stored on, by, or at the PTR 110. Here, the HD channel may be output to the television 114c in accordance with the HDMI/HDCP content protection technologies. Other embodiments are however possible.

Further, the PTR 110 may select via tuner, decode, and relay particular transponder streams to one or both of the STRs 112a-b, which may in turn relay particular transponder streams to a corresponding one of the televisions 114a-b for display thereon. For example, the satellite dish 108 and the PTR 110 may, respectively, be configured to receive, decode, and relay at least one television channel to the television 114a by way of the STR 112a. Similar to the above-example, the television channel may generally be presented live, or from a recording as previously stored on the PTR 110, and may be output to the television 114a by way of the STR 112a in accordance with a particular content protection technology and/or networking standard.

Still further, the satellite dish 108 and the PTR 110 may, respectively, be configured to receive, decode, and relay at least one premium television channel to one or both of the computing device 116a-b. Similar to the above-examples, the television channel may generally be presented live, or from a recording as previously stored on the PTR 110, and may be output to one or both of the computing devices 116a-b in accordance with a particular content protection technology and/or networking standard.

Figure 2:
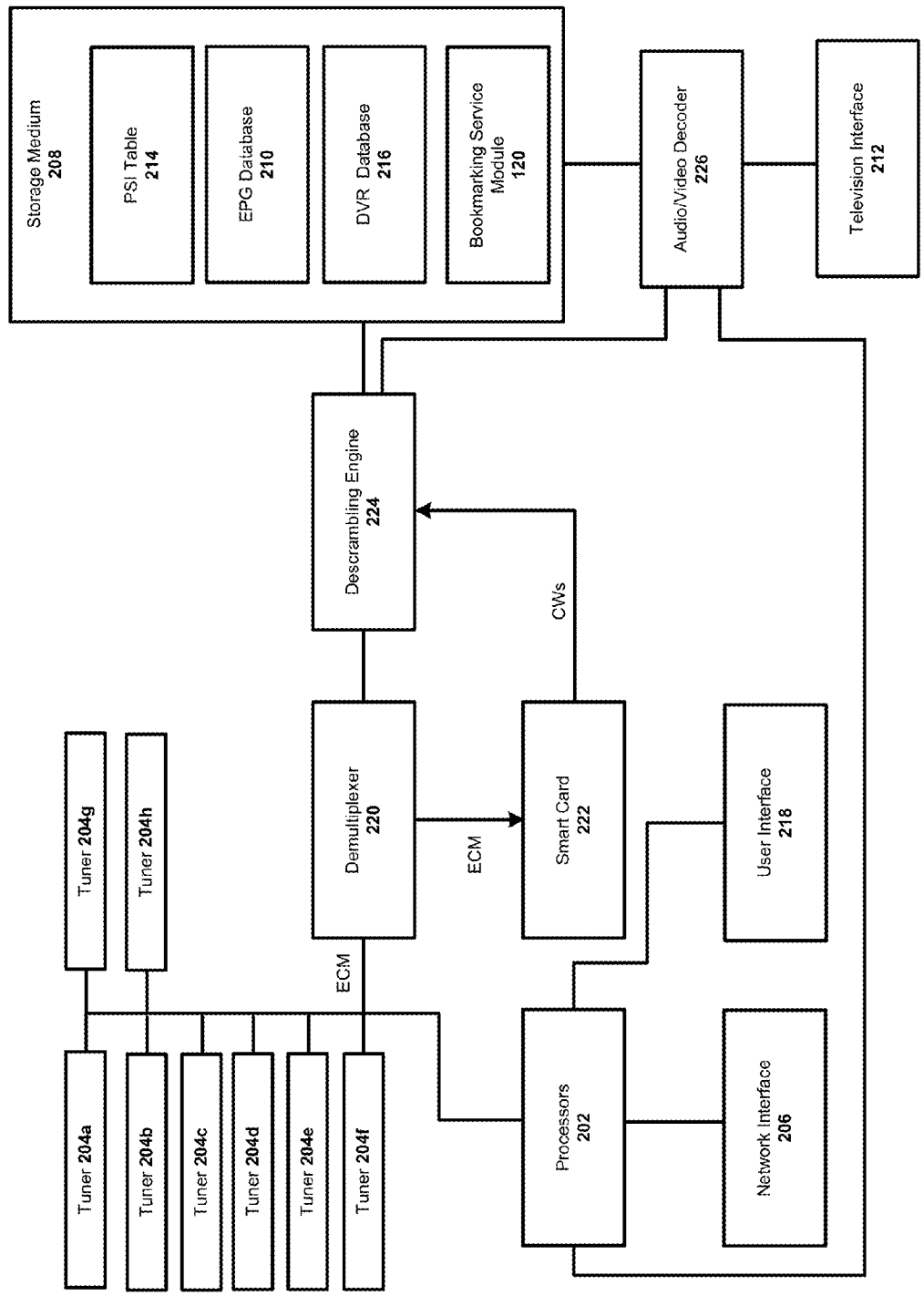
FIG. 2 shows an example block diagram of a television receiver of FIG. 1.

Referring now to FIG. 2, an example block diagram of the PTR 110 of FIG. 1 is shown in accordance with the disclosure. In some embodiments, STRs 112a-b may be configured in a manner similar to that of the PTR 110. In some embodiments, the STRs 112a-b may be configured and arranged to exhibit a reduced functionality as compared to the PTR 110, and may depend at least to a certain degree on the PTR 110 to implement certain features or functionality. The STRs 112a-b in this example may be each referred to as a "thin client."

The PTR 110 may include one or more processors 202, a plurality of tuners 204a-h, at least one network interface 206, at least one non-transitory computer-readable storage medium 208, at least one EPG (Electronic Programming Guide) database 210, at least one television interface 212, at least one PSI (Program Specific Information) table 214, at least one DVR database 216, at least one user interface 218, at least one demultiplexer 220, at least one smart card 222, at least one descrambling engine 224, and at least one decoder 226. In other embodiments, fewer or greater numbers of components may be present. Further, functionality of one or more components may be combined; for example, functions of the descrambling engine 224 may be performed by the processors 202. Still further, functionality of components may be distributed among additional components, and possibly additional systems such as, for example, in a cloud-computing implementation.

The processors 202 may include one or more specialized and/or general-purpose processors configured to perform processes such as tuning to a particular channel, accessing and displaying EPG information, and/or receiving and processing input from a user. For example, the processors 202 may include one or more processors dedicated to decoding video signals from a particular format, such as according to a particular MPEG (Motion Picture Experts Group) standard, for output and display on a television, and for performing or at least facilitating decryption or descrambling.

The tuners 204a-h may be used to tune to television channels, such as television channels transmitted via satellites 106a-c. Each one of the tuners 204a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 204a) may be used to tune to a television channel on a first transponder stream for display using a television, while another tuner (e.g., tuner 204b) may be used to tune to a television channel on a second transponder for recording and viewing at some other time. If multiple television channels transmitted on the same transponder stream are desired, a particular tuner (e.g., tuner 204c) may be used to receive the signal containing the multiple television channels for presentation and/or recording of each of the respective multiple television channels, such as in a PTAT (Primetime Anytime) implementation for example. Although eight tuners are shown, the PTR 110 may include more or fewer tuners (e.g., three tuners, twelve tuners, etc.), and the features of the disclosure may be implemented similarly and scale according to the number of tuners of the PTR 110.

The network interface 206 may be used to communicate via alternate communication channel(s) with a service provider. For example, the primary communication channel between the service provider 102 of FIG. 1 and the PTR 110 may be via satellites 106a-c, which may be unidirectional to the PTR 110, and an another communication channel between the service provider 102 and the PTR 110, which may be bidirectional, may be via the network 124. In general, various types of information may be transmitted and/or received via the network interface 106.

The storage medium 208 may represent a non-transitory computer-readable storage medium. The storage medium 208 may include memory and/or a hard drive. The storage medium 208 may be used to store information received from one or more satellites and/or information received via the network interface 206. For example, the storage medium 208 may store information related to the EPG database 210, the PSI table 214, and/or the DVR database 216, among other elements or features, such as the bookmarking service module 120 mentioned above. Recorded television programs may be stored using the storage medium 208.

The EPG database 210 may store information related to television channels and the timing of programs appearing on such television channels. Information from the EPG database 210 may be used to inform users of what television channels or programs are available, popular and/or provide recommendations. Information from the EPG database 210 may be used to generate a visual interface displayed by a television that allows a user to browse and select television channels and/or television programs for viewing and/or recording. Information used to populate the EPG database 210 may be received via the network interface 206 and/or via satellites 106a-c of FIG. 1. For example, updates to the EPG database 210 may be received periodically via satellite. The EPG database 210 may serve as an interface for a user to control DVR functions of the PTR 110, and/or to enable viewing and/or recording of multiple television channels simultaneously.

The decoder 226 may convert encoded video and audio into a format suitable for output to a display device. For instance, the decoder 226 may receive MPEG video and audio from the storage medium 208, or the descrambling engine 224, to be output to a television. MPEG video and audio from the storage medium 208 may have been recorded to the DVR database 216 as part of a previously-recorded television program. The decoder 226 may convert the MPEG video and audio into a format appropriate to be displayed by a television or other form of display device and audio into a format appropriate to be output from speakers, respectively. The decoder 226 may be a single hardware element capable of decoding a finite number of television channels at a given time, such as in a time-division arrangement. In the example embodiment, eight television channels may be decoded concurrently or simultaneously.

The television interface 212 output a signal to a television, or another form of display device, in a proper format for display of video and play back of audio. As such, the television interface 212 may output one or more television channels, stored television programming from the storage medium 208, such as television programs from the DVR database 216 and/or information from the EPG database 210 for example, to a television for presentation.

The PSI table 214 may store information used by the PTR 110 to access various television channels. Information used to populate the PSI table 214 may be received via satellite, or cable, through the tuners 204a-h and/or may be received via the network interface 206 over the network 124 from the service provider 102 shown in FIG. 1. Information present in the PSI table 214 may be periodically or at least intermittently updated. Information that may be present in the PSI table 214 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some embodiments, the PSI table 214 may be divided into a number of tables, such as a NIT (Network Information Table), a PAT (Program Association Table), a PMT (Program Management Table), etc.

Table 1 below provides a simplified example of the PSI table 214 for several television channels. It should be understood that in other embodiments, many more television channels may be represented in the PSI table 214. The PSI table 214 may be periodically or at least intermittently. As such, television channels may be reassigned to different satellites and/or transponders, and the PTR 110 may be able to handle this reassignment as long as the PSI table 214 is updated.

TABLE 1

| Channel | Satellite | Transponder | ECM PID | Audio PIDs | Video PID |
|---------|-----------|-------------|---------|------------|-----------|
| 4 | 1 | 2 | 27 | 1001 | 1011 |
| 5 | 2 | 11 | 29 | 1002 | 1012 |
| 7 | 2 | 3 | 31 | 1003 | 1013 |
| 13 | 2 | 4 | 33 | 1003, 1004 | 1013 |

It should be understood that the values provided in Table 1 are for example purposes only. Actual values, including how satellites and transponders are identified, may vary. Additional information may also be stored in the PSI table 214. Video and/or audio for different television channels on different transponders may have the same PIDs. Such television channels may be differentiated based on which satellite and/or transponder to which a tuner is tuned.

DVR functionality of the PTR 110 may permit a television channel to be recorded for a period of time. The DVR database 216 may store timers that are used by the processors 202 to determine when a television channel should be tuned to and recorded to the DVR database 245 of storage medium 208. In some embodiments, a limited amount of space of the storage medium 208 may be devoted to the DVR database 216. Timers may be set by the service provider 102 and/or one or more users of the PTR 110. DVR functionality of the PTR 110 may be configured by a user to record particular television programs. The PSI table 214 may be used by the PTR 110 to determine the satellite, transponder, ECM PID, audio PID, and video PID.

The user interface 218 may include a remote control, physically separate from PTR 110, and/or one or more buttons on the PTR 110 that allows a user to interact with the PTR 110. The user interface 218 may be used to select a television channel for viewing, view information from the EPG database 210, and/or program a timer stored to the DVR database 216 wherein the timer may be used to control the DVR functionality of the PTR 110.

Referring back to the tuners 204a-h, television channels received via satellite may contain at least some encrypted or scrambles data. Packets of audio and video may be scrambled to prevent unauthorized users, such as nonsubscribers, from receiving television programming without paying the service provider 102. When one of the tuners 204a-h is receiving data from a particular transponder of a satellite, the transponder stream may be a series of data packets corresponding to multiple television channels. Each data packet may contain a PID, which in combination with the PSI table 214, can be determined to be associated with a particular television channel. Particular data packets, referred to as ECMs may be periodically transmitted. ECMs may be encrypted; the PTR 110 may use the smart card 222 to decrypt ECMs.

The smart card 222 may function as the CA (Controlled Access) which performs decryption of encryption data to obtain control words that are used to descramble video and/or audio of television channels. Decryption of an ECM may only be possible when the user (e.g., an individual who is associated with the PTR 110) has authorization to access the particular television channel associated with the ECM. When an ECM is received by the demultiplexer 220 and the ECM is determined to correspond to a television channel being stored and/or displayed, the ECM may be provided to the smart card 222 for decryption.

When the smart card 222 receives an encrypted ECM from the demultiplexer 220, the smart card 260 may decrypt the ECM to obtain some number of control words. In some embodiments, from each ECM received by the smart card 222, two control words are obtained. In some embodiments, when the smart card 222 receives an ECM, it compares the ECM to the previously received ECM. If the two ECMs match, the second ECM is not decrypted because the same control words would be obtained. In other embodiments, each ECM received by the smart card 222 is decrypted; however, if a second ECM matches a first ECM, the outputted control words will match; thus, effectively, the second ECM does not affect the control words output by the smart card 222. When an ECM is received by the smart card 222, it may take a period of time for the ECM to be decrypted to obtain the control words. As such, a period of time, such as about 0.2-0.5 seconds, may elapse before the control words indicated by the ECM can be obtained. The smart card 222 may be permanently part of the PTR 110 or may be configured to be inserted and removed from the PTR 110.

The demultiplexer 220 may be configured to filter data packets based on PIDs. For example, if a transponder data stream includes multiple television channels, data packets corresponding to a television channel that are not desired to be stored or displayed by the user may be ignored by the demultiplexer 255. As such, only data packets corresponding to the one or more television channels desired to be stored and/or displayed may be passed to either the descrambling engine 224 or the smart card 222; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to the PSI table 214, may be appropriately routed by the demultiplexer 220.

The descrambling engine 224 may use the control words output by the smart card 222 in order to descramble video and/or audio corresponding to television channels for storage and/or presentation. Video and/or audio data contained in the transponder data stream received by the tuners 204a-h may be scrambled. The video and/or audio may be descrambled by the descrambling engine 224 using a particular control word. Which control word output by the smart card 222 to be used for successful descrambling may be indicated by a scramble control identifier present within the data packet containing the scrambled video or audio. Descrambled video and/or audio may be output by the descrambling engine 224 to the storage medium 208 for storage, such as part of the DVR database 216 for example, and/or to the decoder 226 for output to a television or other presentation equipment via the television interface 212.

For brevity, the PTR 110 is depicted in a simplified form, and may generally include more or fewer elements or components as desired, including those configured and/or arranged for enabling satellite television subscribers to bookmark and annotate sections of recorded media content, and also to share and access bookmarks with and created by others, as discussed in the context of the present disclosure. For example, the PTR 110 is shown in FIG. 2 to include the bookmarking service module 120 as mentioned above in connection with FIG. 1. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules.

Additionally, although not explicitly shown in FIG. 2, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 110 may be configured to include any number of other various components or logical modules that are implemented in hardware, software, firmware, or any combination thereof, and such components or logical modules may or may not be implementation-specific.

Figure 3:
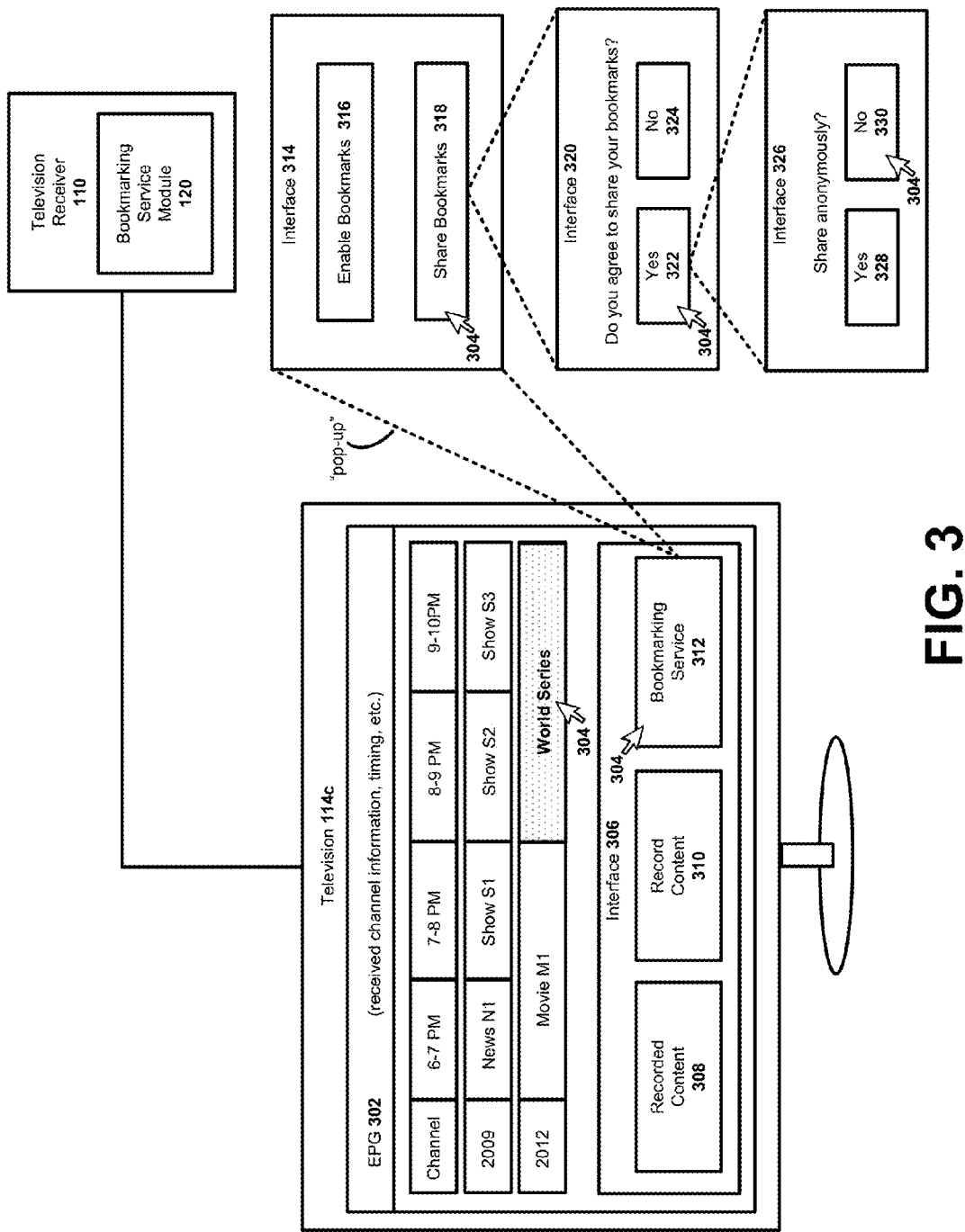
FIG. 3 shows first aspects of the example system of FIG. 1 in detail.

Referring now to FIG. 3, first aspects of the example system 100 of FIG. 1 are shown in detail. In particular, the PTR 110 may be configured to output an EPG (Electronic Programming Guide) 302 to and for presentation the television 114c for example. The EPG 302 may at least present various information related to television channels and the timing of programs or programming appearing on such television channels. For example, as shown in FIG. 3 the EPG 202 may display information associated with a channel 2012, where the "World Series" is listed as scheduled to appear on that channel starting at a particular time on a particular day, and etc. In this example, and assuming that a current time is sometime during the time period 8-10 PM, a viewer may manipulate a cursor 304 using a pointing device (not shown) to select the World Series for immediate viewing. Other embodiments are possible. For example, it is contemplated that any menu-driven navigation technique or implementation may be used to enable user-interaction with the EPG 302, along with other elements or interfaces output by the PTR 110 to the television 114c for display thereon.

In addition to the EPG 302, the PTR 110 may be configured to output various other interactive elements or interfaces. For example, the bookmarking service module 120 of the PTR 110 may be configured to output, within an interface 306, a recorded content selection 308, a record content selection 310, and a bookmarking service selection 312. In general, the recorded content selection 308 may be selected to access recorded programs that are stored to and managed by the PTR 110, as discussed further below. The record content selection 310 in contrast may be selected to set a timer to record a particular program for later viewing. Here, the PTR 110 may exhibit DVR functionality to record programs appearing on such various channels as received from satellites 106a-c. For example, a viewer may manipulate the cursor 304 to select, as shown by stipple shading in FIG. 3, the World Series icon or identifier and then manipulate the cursor 304 to select the record content selection 310 to set a particular timer to automatically record the World Series for later viewing. Other embodiments are possible. For example, selection of the record content selection 310 may instantiate an immediate real-time recording of the World Series.

As discussed above, various aspects of the present disclosure may enable satellite television subscribers to bookmark and annotate sections of recorded media content, and also to share and access bookmarks with others and created by others. At least the bookmarking service selection 312 shown in FIG. 3 may enable such features. For example, a viewer may manipulate the cursor 304 to select the bookmarking service selection 312 to configure various functionality offered by the bookmarking service module 120 of the PTR 110, and possibly the aggregating service module 122 of the server 118 as shown in FIG. 1. For example, the bookmarking service module 120 of the PTR 110 may be configured to output, within an interface 314, an enable bookmarks selection 316 and a share bookmarks selection 318.

In the present example, a viewer may manipulate the cursor 304 to select the enable bookmarks selection 316 to activate the bookmarking service module 120 of the PTR 110, and possibly the aggregating service module 122 of the server 118, so that the viewer may bookmark and annotate sections of recorded media content, and also share and access bookmarks with others and created by others. The viewer may further manipulate the cursor 304 to select the share bookmarks selection 318 to access an interface 320 that may provide the viewer an option to "opt-in," by selection of Yes button 322, to sharing bookmarks generated by that viewer with others.

Alternatively, the viewer may "opt-out," by selection of No button 324, to sharing bookmarks generated by the viewer with others. In some embodiments, upon selection of Yes button 322, the viewer may further manipulate the cursor 304 to interact with an interface 326 that may provide the viewer the option to opt-in, by selection of Yes button 328, to sharing bookmarks generated by the viewer anonymously with others. Alternatively, a viewer may opt-out, by selection of No button 330, to sharing bookmarks generated by the viewer anonymously with others. In this manner, the bookmarking service module 120 of the PTR 110 may allow a viewer to customize various bookmarking aspects or features as discussed in the context of the disclosure. Other customization-related features are possible as well.

Figure 4:
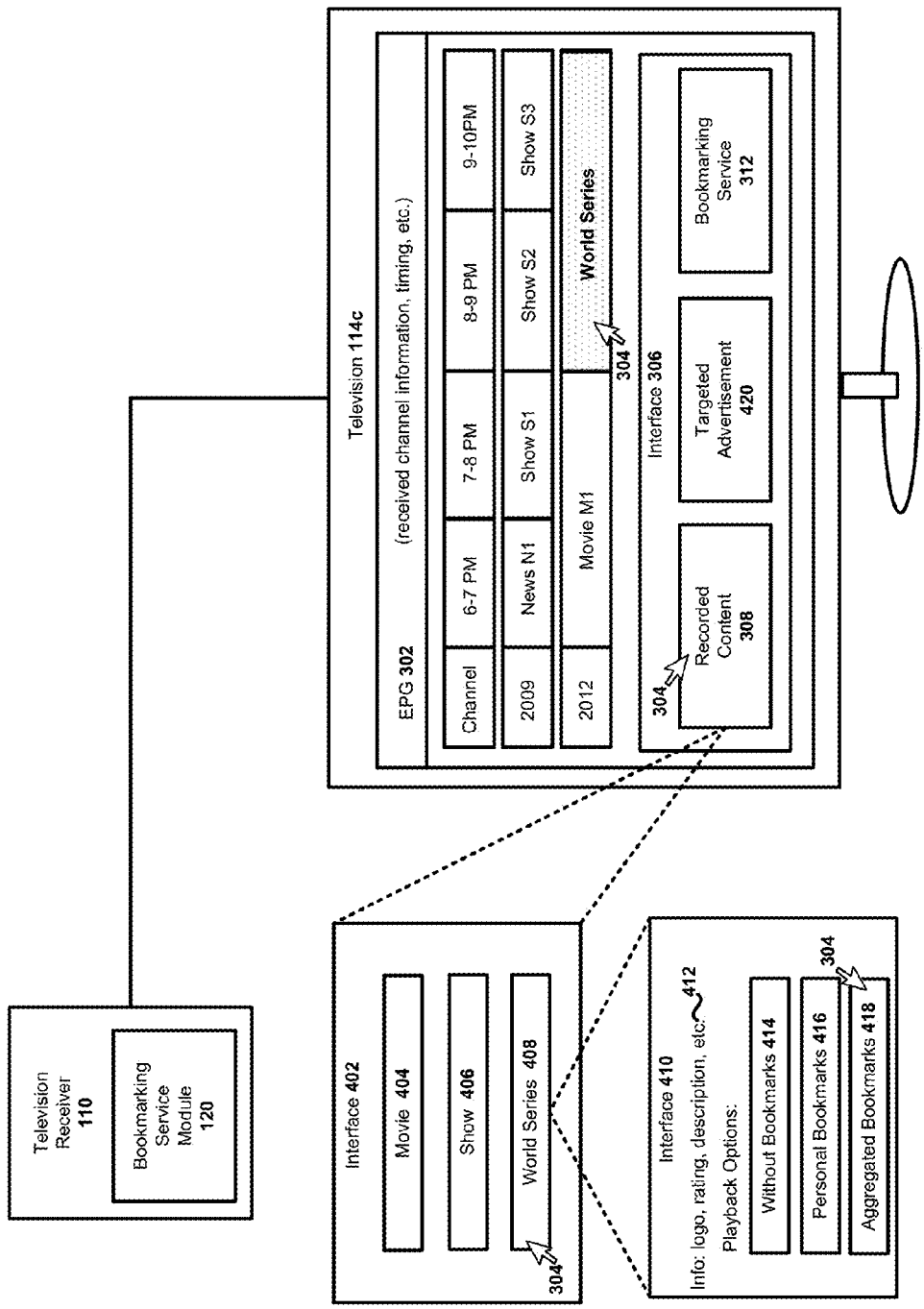
FIG. 4 shows second aspects of the example system of FIG. 1 in detail

For example, referring now to FIG. 4, second aspects of the example system 100 of FIG. 1 are shown in detail. As mentioned above, the recorded content selection 308 may be selected to access recorded programs that are stored to and managed by the PTR 110. For example, a viewer may manipulate the cursor 304 to select the recorded content selection 308, and in this example the PTR 110 may be configured to output, within an interface 402, a movie selection 404, a show selection 406, and a sporting event selection 408. The movie selection 404 is intended to indicate that a particular movie is stored to the PTR 110 as recorded content. Further, the show selection 406 is intended to indicate that a particular episode of a television show is stored to the PTR 110 as recorded content. Further, the sporting event selection 408 is intended to indicate that a particular sporting event is stored to the PTR 110 as recorded content. In general, a viewer may manipulate the cursor 304 to select each one of the movie selection 404, show selection 406, and sporting event selection 408 for immediate viewing by a "point and double-click" action for example. In another embodiment, a viewer may manipulate the cursor 304 and perform a "point and single-click" action, or a "point and hover" action, for example, to access an interface 410 that provides information about a selected recording, but also provides the viewer an option to play back a recording with or without bookmarks.

For example, a viewer may manipulate the cursor 304 to perform a point and single-click action against the sporting event selection 408 to access the interface 410. Here, the bookmarking service module 120 of the PTR 110 may be configured to output, within the interface 410, various information 412 about the sporting event selection 408. The bookmarking service module 120 of the PTR 110 may further be configured to output, within the interface 410, a number of playback options for the viewer to select from, including a without bookmarks selection 414, a personal bookmarks selection 416, and an aggregated bookmarks selection 418. Other embodiments are possible. For example, in some embodiments another selection may be provided within the interface 410, such as a hybrid selection that encompasses or captures both the personal bookmarks selection 416 and the aggregated bookmarks selection 418. Still other embodiments are possible.

In the present example, the without bookmarks selection 414 may be selected so that the sporting event associated with the sporting event selection 408 may be played-back by the PTR 110 to the television 114c without providing the viewer an option to access any bookmarks that may be associated with the sporting event selection 408. In contrast, the personal bookmarks selection 416 may be selected so that the sporting event associated with the sporting event selection 408 may be played-back by the PTR 110 to the television 114c while providing the viewer an option to access bookmarks, possibly created by the viewer, associated with the sporting event selection 408. In this example, the bookmarking service module 120 of the PTR 110 may access a local data store to retrieve and present bookmarks generated by a viewer or customer associated with the PTR 110, or possibly a customer account associated with the PTR 110. In this manner, upon selection of the personal bookmarks selection 416, "private" bookmarks may be made available to the viewer during play back of the sporting event associated with the sporting event selection 408. The bookmarks are private because those bookmarks are not necessarily shared with others.

The aggregated bookmarks selection 418 may be selected so that the sporting event associated with the sporting event selection 408 may be played-back by the PTR 110 with the PTR 110 providing a viewer the option to access bookmarks, possibly created by any number of other or different viewers, associated with the sporting event selection 408. In this example, the bookmarking service module 120 of the PTR 110 may access the aggregating service module 122 shown in FIG. 1 to retrieve bookmarks generated by viewers or customers generally unassociated with the PTR 110. Here, the aggregating service module 122 may periodically, or at least intermittently, receive from a plurality of different television receivers a report that includes a list or listing of bookmarks generated by a viewer or customer associated with each particular television receiver. In this manner, upon selection of the aggregated bookmarks selection 418, "non-private" bookmarks may be made available to a viewer during play back of the sporting event associated with the sporting event selection 408. The bookmarks are non-private because those bookmarks are shared bookmarks.

Figure 5:
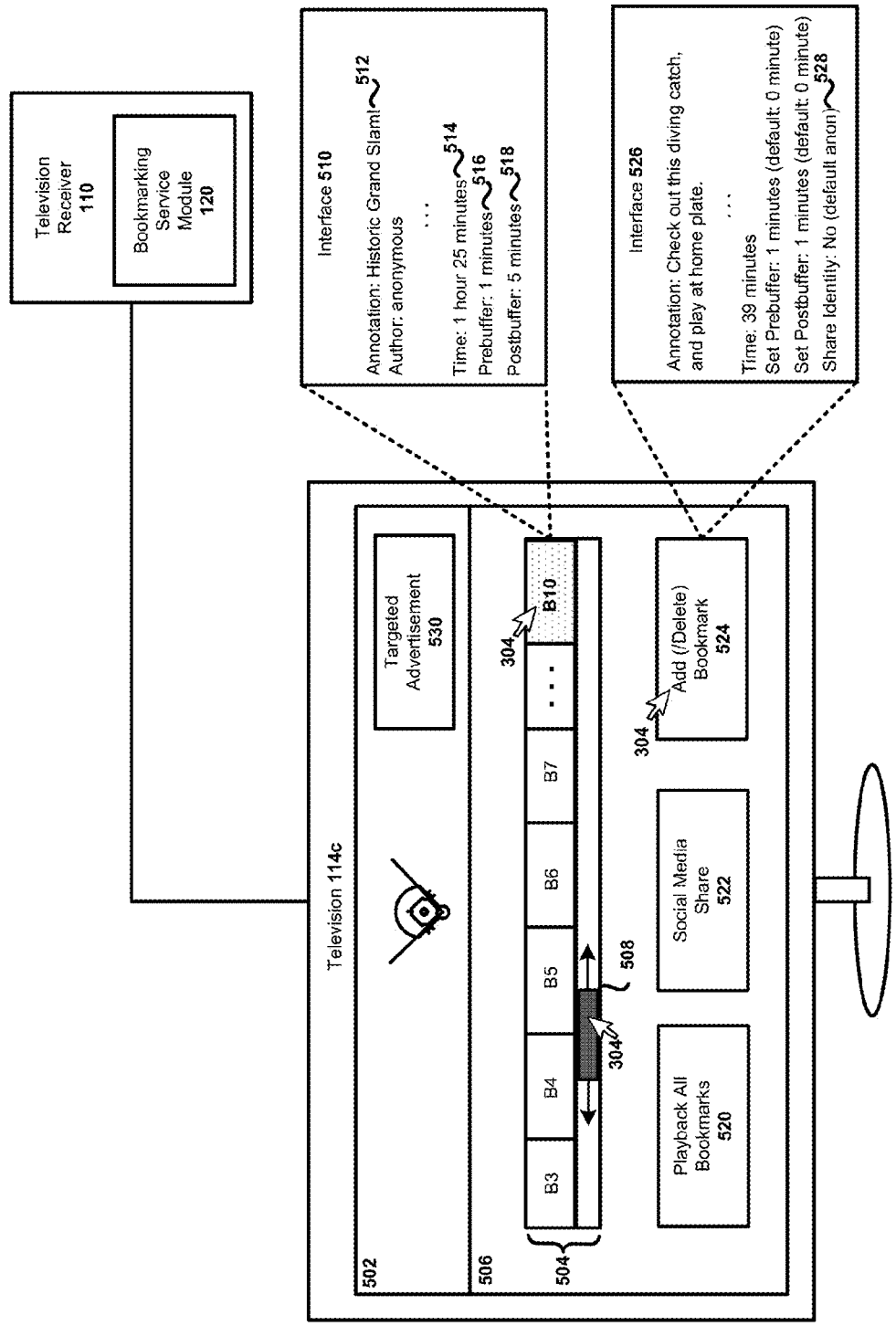
FIG. 5 shows third aspects of the example system of FIG. 1 in detail

Referring now to FIG. 5, third aspects of the example system 100 of FIG. 1 are shown in detail. Here, it is assumed that a viewer has manipulated the cursor 304 to select the sporting event selection 408 shown in FIG. 4, so that the sporting event associated with the sporting event selection 408 is currently being played-back by the PTR 110 to the television 114c. For example, in FIG. 5 the World Series as stored as a recording by the PTR 110 is currently being played-back within a first window 502 as displayed on the television 114c. It is further assumed that a viewer has manipulated the cursor 304 to select the aggregated bookmarks selection 418 shown in FIG. 4, so that the sporting event associated with the sporting event selection 408 may be played-back by the PTR 110 with the PTR 110 providing a viewer the option to access bookmarks, created by any number of other or different viewers, associated with the sporting event selection 408.

For example, as shown in FIG. 5, the bookmarking service module 120 of the PTR 110 may output for display at least a bookmark progress bar 504 within a second window 506 as presented on the television 114c. In general, the bookmark progress bar 504 may provide a viewer an option to access various bookmarks, created by any number of other or different viewers, associated with the sporting event selection 408. For example, a viewer may manipulate the cursor 304 and perform a "point and single-click and hold" action to control a slide bar 508 to access any particular bookmark associated with the sporting event selection 408. Further, a viewer may manipulate the cursor 304 and perform a point and double-click action, for example, to access a particular bookmark. For example, a viewer may manipulate the cursor 304 and perform a point and double-click action to select and access a particular bookmark B10.

Here, when the bookmark B10 is selected, the bookmarking service module 120 of the PTR 110 may access the recording of the sporting event associated with the sporting event selection 408, and play back the sporting event for display within the first window 502 starting at a time within the recording associated with the bookmark B10. For example, assuming that the bookmark B10 is defined or associated with a particular time of 1 hour 25 minutes into the recording, the bookmarking service module 120 of the PTR 110 may access the recording of the sporting event associated with the sporting event selection 408, and play back the sporting event for display within the first window 502 starting at a time of 1 hour 25 minutes into the recording. In one embodiment, the PTR 110 may play back the sporting event for display within the first window 502 starting at the time of 1 hour 25 minutes into the recording until completion of the recording, assuming no other bookmarks are accessed. Other embodiments are however possible.

For example, the bookmark B10 may be defined so that only a clip of the sporting event associated with the sporting event selection 408 is played back upon selection of the bookmark B10. Details associated with this example implementation are shown in FIG. 5. For example, a viewer may manipulate the cursor 304 to perform a point and hover action against the bookmark B10 to access an interface 510. The bookmarking service module 120 of the PTR 110 may be configured to output, within the interface 510, an annotation that was previously added by a particular individual that may describe content within the sporting event associated with the sporting event selection 408 at a time associated with the bookmark B10. For example, an annotation 512 or narrative "Historic Grand Slam!" may describe content within the sporting event at the time of 1 hour 25 minutes into the recording.

In the present example, the bookmarking service module 120 of the PTR 110 may be configured to output, within the interface 510, a number of time related parameters that define a precise time 514 associated with the "Historic Grand Slam!" along with a prebuffer parameter 516 and a postbuffer parameter 518. In this example, the prebuffer parameter 516 and postbuffer parameter 518 may define a duration of a clip played back upon selection of the bookmark B10. For example, since the precise time 514 in FIG. 5 is defined as 1 hour 25 minutes into the recording, the bookmarking service module 120 of the PTR 110 may access the recording of the sporting event associated with the sporting event selection 408, and play back the sporting event for display within the first window 502 starting at a time of 1 hour 24 minutes into the recording, until a time of 1 hour 30 minutes into the recording. In this example, the PTR 110 may play back a 6-minute clip of the sporting event for display within the first window 502 upon selection of the bookmark B10, and other bookmarks accessible through the bookmark progress bar 504 may be accessed in a similar manner. Other embodiments are however possible.

For example, the bookmarking service module 120 of the PTR 110 may be configured to output, within the second window 506, a playback all bookmarks selection 520. Here, a viewer may manipulate the cursor 304 and perform a point and double-click action to select and access each of the bookmarks accessible through the bookmark progress bar 504. In one embodiment, a clip associated with each particular bookmark accessible through the bookmark progress bar 504 may be played-back in a consecutive manner. For example, a clip associated with a bookmark B1 may be played-back, immediately followed by a clip associated with a bookmark B2, and etc. In this manner, the playback all bookmarks selection 520 may function much like a highlight reel. Additionally, during play back of clips associated with each particular bookmark accessible through the bookmark progress bar 504, a viewer may manipulate the cursor 304 and perform a point and single-click and hold action to control a slide bar 508, and then perform a point and hover action against any particular bookmark to access the interface 510 to obtain additional information about a bookmark. Other features are possible as well.

For example, the bookmarking service module 120 may be configured to output, within the second window 506, a social media share selection 522. Here, a viewer may manipulate the cursor 304 and perform a point and single-click action to select, as shown by stipple shading in FIG. 5, the particular bookmark B10. A viewer may then manipulate the cursor 304 and perform a point and double-click action to select the social media share selection 522. In response, the bookmarking service module 120 may be configured to post information associated with the particular bookmark B10 (e.g., such as that listed within interface 510) to a particular social networking website or application. For example, upon selection of the social media share selection 522 in the present scenario, the bookmarking service module 120 may be pre-configured to contact and post information associated with the particular bookmark B10 to a particular Facebook account, Twitter account, and etc. Still other features are possible as well.

For example, the bookmarking service module 120 may be configured to output, within the second window 506, an add bookmark selection 524. Here, a viewer may manipulate the cursor 304 and perform a point and double-click action to select the add bookmark selection 524. In response, the bookmarking service module 120 may be configured to output an interface 526 that may enable a viewer to define a particular bookmark. In general, the particular bookmark may be associated with a particular time that corresponds to a time when the add bookmark selection 524 was selected during play back of the recording of the sporting event associated with the sporting event selection 408. For example, the bookmarking service module 120 may associate the particular bookmark with a particular time of 39 minutes into that recording, assuming that this was the time during play back of the recording that corresponds to a time when the add bookmark selection 524 was selected.

In example embodiments, a viewer may further add an annotation to the particular bookmark, and also set a prebuffer and postbuffer if desired. For example, a viewer may add an annotation or narrative "Check out this diving catch, and play at home plate" that may describe content within the sporting event associated with the sporting event selection 408 at the time 39 minutes into the recording. In this example, the viewer may specify whether or not their identity is to be disclosed so that when or if the bookmark as defined within the interface 526 is shared, that bookmark may be shared anonymously, or not, with others. For example, the bookmarking service module 120 of the PTR 110 may be configured to output, within the interface 526, an identity parameter 528 so that the viewer may specify whether or not their identity is to be disclosed so that when or if the bookmark as defined within the interface 526 is shared that bookmark may be shared anonymously, or not, with others.

Further, so that someone watching content associated with the particular bookmark as defined within the interface 526 may get to experience that content fully, a prebuffer of 1 minute may be set by the viewer so that someone watching content associated with the particular bookmark may observe a batter hitting a baseball prior to the diving catch for example. Still further, so that someone watching content associated with the particular bookmark as defined within the interface 526 may get to experience that content fully, a postbuffer of 1 minute may be set by the viewer so that someone watching content associated with the particular bookmark may observe the play at home plate followed by a celebration by the fans and players for example. Details associated the prebuffer and postbuffer of the present application are discussed in further detail in connection with FIG. 6.

Figure 6:
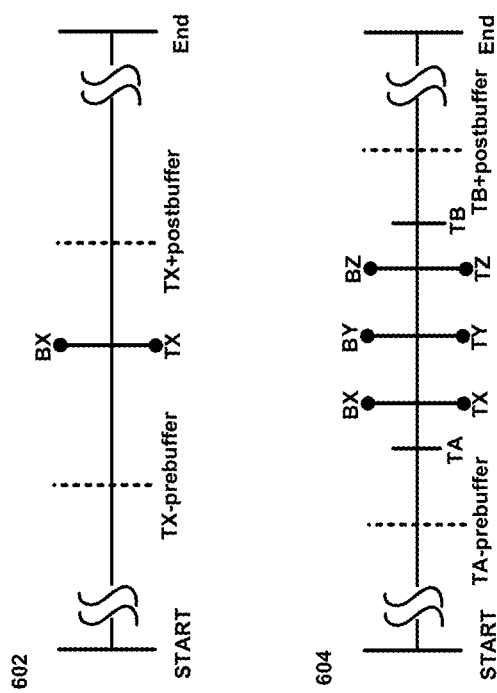
FIG. 6 shows example timelines in accordance with the disclosure.

For example, referring now to FIG. 6, a number of timelines are shown in accordance with the disclosure. More specifically, a first timeline 602 shows a particular bookmark BX within an instance of particular recorded content. The particular bookmark BX is associated with a particular time TX. Additionally, a first time period (TX−prebuffer) and a second time period (TX+postbuffer) are shown in relation to the particular time TX. In this example, the particular bookmark BX may correspond to a private bookmark within the instance of particular recorded content. That is, the particular bookmark BX is not shared. When the particular bookmark BX is selected for playback, the bookmarking service module 120 as discussed above may access the recording of the instance of particular recorded content, and play back associated content starting at a time of (TX−prebuffer) into the recording, until a time of (TX+postbuffer) into the recording.

FIG. 6 also shown a second timeline 604. In this example, the second timeline 604 shows a particular bookmark BX, followed in time by a particular bookmark BY, followed in time by a particular bookmark BZ within an instance of particular recorded content. Similar to that discussed above, the bookmark BX is associated with a particular time TX, the bookmark BY is associated with a particular time TY, and the bookmark BZ is associated with a particular time TZ. The time TX, the time TY, and the time TZ are defined between a time TA and a time TB within the instance of particular recorded content. In this example, the difference between time TA and time TB is a fixed configurable interval, such as 1 minute or 30 seconds for example. Further, a time period (TA−prebuffer) and a time period (TB+postbuffer) are shown in relation to the particular time TA and time TB.

As shown in the second timeline 604, the bookmarks BX-BZ may each correspond to a non-private bookmark within the instance of particular recorded content. That is, the particular bookmarks BX-BZ are shared, but not necessarily by the same individual. In this example, to simplify crowd-sourced bookmark aggregation, the aggregating service module 122 may map any bookmarks defined within a particular interval to a beginning point in time of the particular interval. For example, the aggregating service module 122 may map each of the bookmarks BX-BZ as defined within the interval TA to TB to the time TA. Subsequently, when one of the bookmarks BX-BZ are selected for playback, the bookmarking service module 120 as discussed above may access the recording of the instance of particular recorded content, and play back associated content starting at a time of (TA−prebuffer) into the recording, until a time of (TB+postbuffer) into the recording. In this manner, the aggregating service module 122 may consolidate crowd-sourced bookmarks so that multiple events bookmarked within a particular interval are captured, including a prebuffer and postbuffer so that events leading up to and following events bookmarked within the particular interval are also captured.

As mentioned above, in some embodiments, the time period for each bookmark element may be on the order of 1 minute or 30 seconds, for example, so that a user may bookmark a minimum of 30 second intervals and so on in increasing order. Here, in a 30 second interval between TA and TB for example only one bookmark may be recognized. This may help to minimize redundancy, especially when multiple users have bookmarked a same section. In some embodiments, this may apply both to private as well as public bookmarks.

Figure 7:
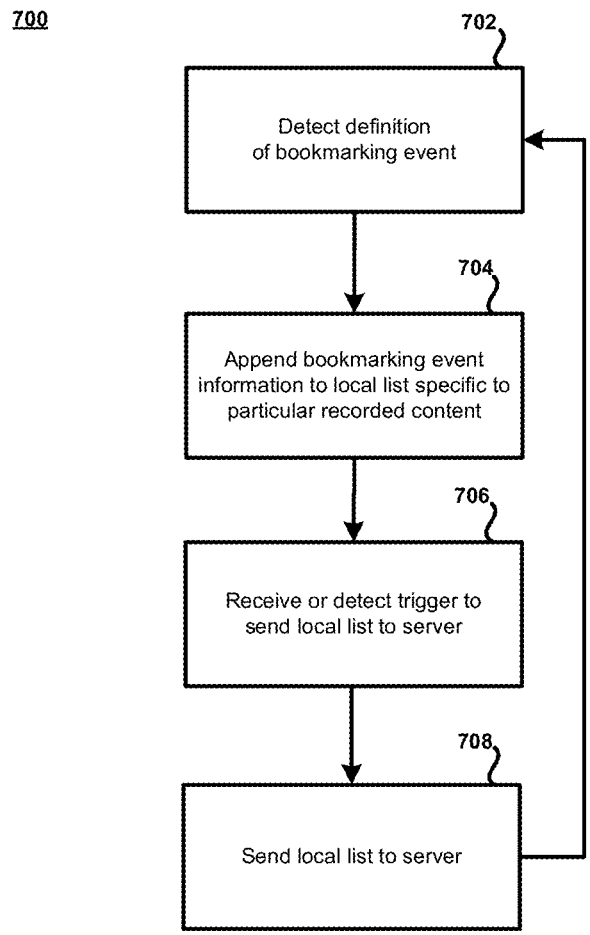
FIG. 7 shows a first example method in accordance with the disclosure.

Referring now to FIG. 7, a first example method 700 is shown in accordance with the disclosure. The various steps or modules of the example method 700 may be performed by the PTR 110 of FIG. 1. Other embodiments are possible. For example, one or more steps or modules of the method 700 may be performed by one or more of the other elements of FIG. 1.

At step 702, the PTR 110 may detect definition of a bookmarking event. For example, during play back of the World Series as discussed above in connection with FIG. 5, a viewer may create or add bookmark that includes an annotation "Check out this diving catch, and play at home plate" that describes content within the sporting event associated with the sporting event selection 408 at a time of 39 minutes into the recording. The viewer may further optionally define a prebuffer, postbuffer, and set an identity parameter so that the viewer may specify whether or not their identity is to be disclosed so that when or if the bookmark is shared that bookmark may be shared anonymously, or not, with others. Other embodiments are possible.

At step 704, the PTR 110 may append detected bookmarking event information to a list as stored within a database local to the PTR 110. For example, the PTR 110 may append at least the following information to a list as stored within a database local to the PTR 110, narrative: Check out this diving catch, and play at home plate; time: 39 minutes; prebuffer: 1 minute; postbuffer: 1 minute; identity parameter: anonymous. In some embodiments, the list may be specific to an particular instance of recorded media content. For example, the recording of the World Series may have associated with it a first particular list, and a recording of a Movie may have associated with it a second particular list that is completely different than the first particular list. In this example, each instance of content recorded to or by the PTR 110 may have its own particular list/database entry. Other embodiments are possible.

At step 706, the PTR 110 may receive or detect a trigger to send the list as stored within a database local to the PTR 110 to the aggregating service module 122 of the server 118. For example, the PTR 110 itself may periodically or at least intermittently generate a trigger so that the PTR 110 may report all shared bookmarks and associated information to the aggregating service module 122. In another example, the aggregating service module 122 may periodically or at least intermittently generate a trigger that is sent to the PTR 110 so that the PTR 110 may in response report all shared bookmarks and associated information to the aggregating service module 122. Other embodiments are possible.

At step 708, the PTR 110 may send the list as stored to the PTR 110 to the aggregating service module 122 of the server 118. In this example, the aggregating service module 122 may append all information as contained within the "local" list into a "global" list that contains a listing of bookmarks and related information generated across multiple television receivers, so that bookmarks marked as non-private received by the aggregating service module 122 may be consolidated and shared amongst multiple subscribers or customers of the service provider 102 of FIG. 1. Other embodiments are possible.

For example, in some embodiments, the PTR 110 may not send the entire list as stored to the PTR 110 to the aggregating service module 122 of the server 118. For example, assuming that the list currently has 5 entries, listed as Entry 1, Entry 2, Entry 3, Entry 4, and Entry 5, the bookmarking service module 120 may make a determination as to which if any of those entries has been previously supplied to the aggregating service module 122 of the server 118, and then only send those entries that have not been previously supplied to the aggregating service module 122. For example, if the PTR 110 determines that Event 1, Entry 2, Entry 3, and Entry 4, were each reported to the aggregating service module 122 "yesterday" at 11 PM, the PTR 110 may only report the Event 5 "today" at 11 PM, since each of the Events 1-4 were already reported. Such an implementation may be beneficial and/or advantageous in many respect. For example, the total amount of information reported to the aggregating service module 122 across all subscribers or customers participating in the bookmarking service may be minimized, reducing the amount data transferred among respective devices of FIG. 1, and also reducing the amount of bandwidth used by each respective television receiver (e.g., PTR 110) to send a particular list to the server 118.

Figure 8:
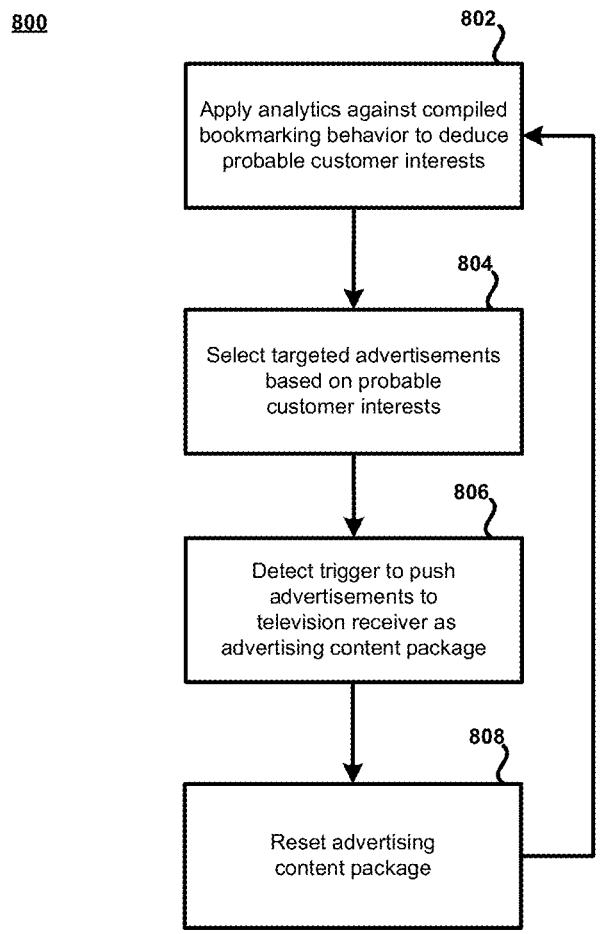
FIG. 8 shows a second example method in accordance with the disclosure.

Referring now to FIG. 8, a second example method 800 is shown in accordance with the disclosure. The various steps or modules of the example method 800 may be performed by the server 118 of FIG. 1. Other embodiments are possible. For example, one or more steps or modules of the method 800 may be performed by one or more of the other elements of FIG. 1.

At step 802, the server 118 may apply analytics against each instance of the list sent to the server 118 from the PTR 110 (e.g., step 708 of FIG. 7), to determine or identify probable interests of a subscriber associated with the PTR 110. For example, the server 118 may save and compile each instance of the list sent to server 118 from the PTR 110, and deduce based on historical patterns or usage that the subscriber is at least an avid baseball fan. Other embodiments are possible.

At step 804, the server 118 may implement an algorithm to select one or more targeted advertisements based on the identified probable interests. For example, the server 118 may select a subscription-based sports package offered by the service provider 102 whose content is "All baseball all the time," and as part of a campaign to sell that package may include information about the package whereby the package is currently available at a discount of "25% off if subscribed to within the next 3 days." In this example, one or more other targeted advertisements related to baseball and possibly any other identified interests may be selected as well. Further, if those targeted advertisements are third party advertisements, the service provider 102 may charge a fee and thus derive revenue from a particular third party in return for selecting such advertisements. Other embodiments are possible.

At step 806, the server 118 may receive or detect a trigger to push the one or more selected targeted advertisements to the PTR 110, as part of a particular advertising content package. For example, the server 118 itself may periodically or at least intermittently generate a trigger so that the server 118 may send selected targeted advertisements to the PTR 110. In another example, the PTR 110 may periodically or at least intermittently generate a trigger that is sent to the server 118, so that the server 118 may in response send selected targeted advertisements to the PTR 110. It is contemplated that the PTR 110 may insert targeted advertisements in any manner as desired into the EPG 302 so that the targeted advertisements are clearly visible and accessible to a viewer. An example of such an implementation is shown by targeted advertisement 420 in FIG. 4. Another example of such an implementation is shown by targeted advertisement 530 in FIG. 5. Other embodiments are possible as well. For example, a particular advertisement or on-demand movie may be shown as a banner within the EPG 302, and may be selected by a shortcut button presented within the banner. Still other embodiments are possible.

At step 808, the server 118 may reset the advertising content package specific to the PTR 110 and stored to the server 118. In this example, the server 118 may delete all information from the advertising content package, so that the size of the advertising content package as stored to the server 118 is minimized. Such an implementation may be beneficial and/or advantageous in many respect. For example, the total amount of advertisement or advertising content reported by the server 118 across all subscribers or customers participating in the bookmarking service enabled by the aggregating service module 122 may be minimized, reducing the amount data transferred among the respective devices of FIG. 1, and also reducing the amount of bandwidth needed or used by each respective television receiver (e.g., PTR 110) to receive targeted advertisements from the server 118.

As discussed throughout, systems and methods of the present disclosure enable satellite television subscribers to bookmark and annotate sections of recorded media content, and also to share and access bookmarks with and created by others. It is contemplated that in a crowd-sourcing or aggregated bookmark implementation, each event may be broken down into particular intervals, such as 1 minute intervals, or 30 second intervals, for example. This may help aggregate bookmarks to standard sections of recorded content. Additionally, social networking integration may be used to share events.

Further, a "more info pop-up" may be used to surface the top 5 or 10 bookmarks, for example, associated with a piece of recorded content. For example, a user may hover (via cursor 304) over the show selection 406 within the interface 402 as shown in FIG. 4 to bring up the "more info pop-up." In this example, a brief description of the recorded content may be provided within the pop-up, as well as a selectable button or icon associated with each one of the top 5 or 10 bookmarks. A particular selectable button or icon when pressed may instantiate play back of a particular bookmark. Further, in some embodiments, a "delete" button similar to the add bookmark selection 524 discussed above may be provided within interface 506. Here, a user may have an option to delete a bookmark, in event the user hits a maximum limit on number of bookmarks allowed per piece of recorded media content for example.

Further, it is contemplated that if a user wants to bookmark a particular part of an event, say a touchdown in a football match, the user could hit a "hot key" on their remote control device that would bring up a screen that would let the user set the bookmark. Further, it is contemplated that bookmark data may be shared with mobile application so that users may have easy accessibility to their bookmarks, and provide detailed annotations that may otherwise be difficult or cumbersome to enter using a remote control device for example.

Figure 9:
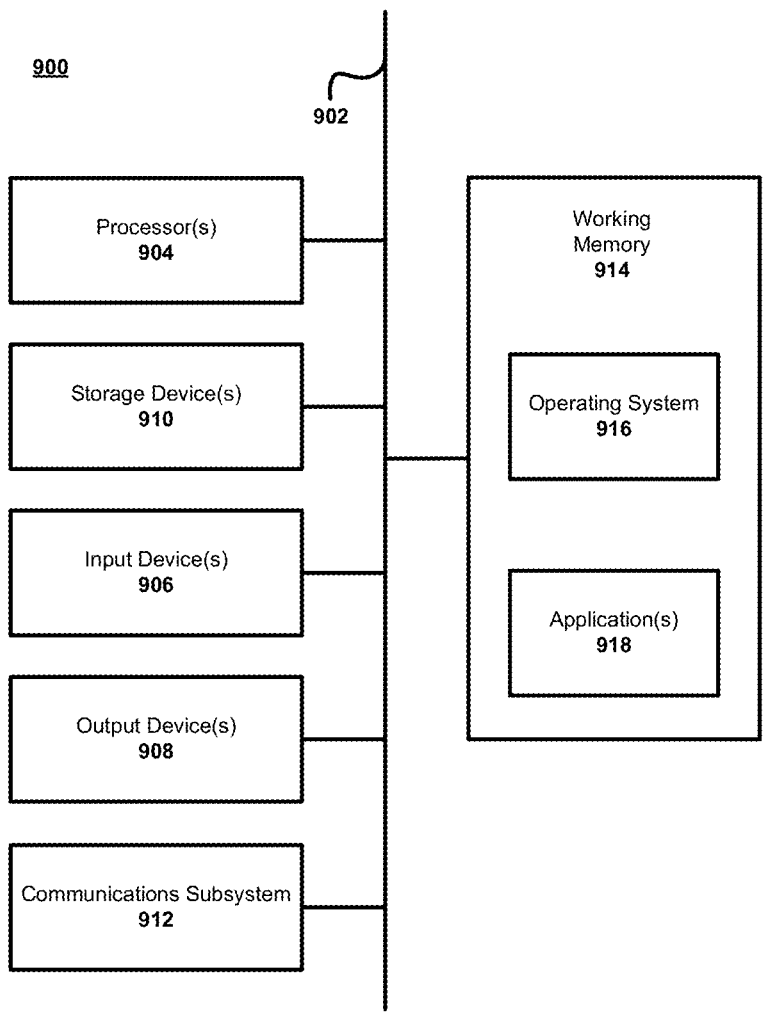
FIG. 9 shows an example computing system or device.

FIG. 9 shows an example computer system or device 900 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 900, such as any of the respective elements of at least FIG. 1. In this manner, any of one or more of the respective elements of at least FIG. 1 may be configured to perform and/or include instructions that, when executed, perform the method of FIG. 7 and/or the method of FIG. 8. Still further, any of one or more of the respective elements of at least FIG. 1 may be configured to perform and/or include instructions that, when executed, instantiate and implement functionality of the PTR 110 and/or the server 118.

The computer device 900 is shown comprising hardware elements that may be electrically coupled via a bus 902 (or may otherwise be in communication, as appropriate). The hardware elements may include a processing unit with one or more processors 904, including without limitation one or more general-purpose processors and/or one or more special-purpose processors (such as digital signal processing chips, graphics acceleration processors, and/or the like); one or more input devices 906, which may include without limitation a remote control, a mouse, a keyboard, and/or the like; and one or more output devices 908, which may include without limitation a presentation device (e.g., television), a printer, and/or the like.

The computer system 900 may further include (and/or be in communication with) one or more non-transitory storage devices 910, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 900 might also include a communications subsystem 912, which may include without limitation a modem, a network card (wireless and/or wired), an infrared communication device, a wireless communication device and/or a chipset such as a Bluetooth™ device, 902.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 912 may permit data to be exchanged with a network (such as the network described below, to name one example), other computer systems, and/or any other devices described herein. In many embodiments, the computer system 900 will further comprise a working memory 914, which may include a random access memory and/or a read-only memory device, as described above.

The computer device 900 also may comprise software elements, shown as being currently located within the working memory 914, including an operating system 916, device drivers, executable libraries, and/or other code, such as one or more application programs 918, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 910 described above. In some cases, the storage medium might be incorporated within a computer system, such as computer system 900. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 900) to perform methods in accordance with various embodiments of the disclosure. According to a set of embodiments, some or all of the procedures of such methods are performed by the computer system 900 in response to processor 904 executing one or more sequences of one or more instructions (which might be incorporated into the operating system 916 and/or other code, such as an application program 918) contained in the working memory 914. Such instructions may be read into the working memory 914 from another computer-readable medium, such as one or more of the storage device(s) 910. Merely by way of example, execution of the sequences of instructions contained in the working memory 914 may cause the processor(s) 904 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 900, various computer-readable media might be involved in providing instructions/code to processor(s) 904 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 910. Volatile media may include, without limitation, dynamic memory, such as the working memory 914.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 904 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 912 (and/or components thereof) generally will receive signals, and the bus 902 then might carry the signals (and/or the data, instructions, etc. carried by the signals) to the working memory 914, from which the processor(s) 904 retrieves and executes the instructions. The instructions received by the working memory 914 may optionally be stored on a non-transitory storage device 910 either before or after execution by the processor(s) 904.

It should further be understood that the components of computer device 900 can be distributed across a network. For example, some processing may be performed in one location using a first processor while other processing may be performed by another processor remote from the first processor. Other components of computer system 900 may be similarly distributed. As such, computer device 900 may be interpreted as a distributed computing system that performs processing in multiple locations. In some instances, computer system 900 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A television receiver, comprising:
   one or more processors; and
   a memory communicatively coupled with and readable by the one or more processors and having stored therein processor-readable instructions that, when executed by the one or more processors, cause the one or more processors to perform operations including:
     outputting, for presentation by a display device, a first user interface that provides an activation item that, when selected, activates a service for bookmarking recorded media accessible to the television receiver, a first authorization item that, when selected, authorizes sharing of particular bookmarks associated with recorded media by the television receiver with a remote computer system, and a second authorization item that, when selected, authorizes access to crowd-sourced bookmarks;
     detecting input corresponding to selection of the second authorization item;
     outputting, for presentation by the display device, a second user interface that provides a first command item that, when selected, commands the television receiver to playback particular recorded media without access to bookmarks associated with the particular recorded media, and a second command item that, when selected, commands the television receiver to playback the particular recorded media with access to bookmarks associated with the particular recorded media;

detecting input corresponding to selection of the second command item;

outputting, for presentation by the display device, a playback of the particular recorded media with access to crowd-sourced bookmarks associated with the particular recorded media;

receiving input corresponding to creation of a new bookmark associated with the particular recorded media, wherein the input identifies an annotation for the new bookmark, wherein the input identifies a duration of a clip of the particular recorded media, and wherein the input identifies an identity parameter indicating that the new bookmark is to be shared anonymously;

updating a list of generated bookmarks with the new bookmark;

transmitting the list of generated bookmarks to the remote computer system;

receiving an advertising content package including a targeted advertisement associated with the list of generated bookmarks;

outputting, for presentation by the display device, an electronic programming guide including the targeted advertisement associated with the list of generated bookmarks; and outputting, for presentation by the display device, an additional user interface that provides access to an item that, when selected, commands the television receiver to output to the display device another user interface that enables deletion of the new bookmark associated with the particular recorded media.

2. The television receiver of claim 1, wherein the operations further include:

outputting, for presentation by the display device, a third user interface that provides access to an item that, when selected, commands the television receiver to playback at least a particular clip of the particular recorded media that is associated with a particular bookmark.

3. The television receiver of claim 1, wherein the operations further include:

outputting, for presentation by the display device, a third user interface that provides access to an item that, when selected, commands the television receiver to output to the display device another user interface that at least includes a description of content within the particular recorded media that is associated with a particular bookmark.

4. The television receiver of claim 1, wherein the operations further include:

outputting, for presentation by the display device, a third user interface that provides access to a bookmark progress bar.

5. The television receiver of claim 1, wherein the operations further include:

outputting, for presentation by the display device, a third user interface that provides access to at least one item that, when selected, commands the television receiver to communicate with a social networking service to transfer information to the social networking service that is associated with a particular bookmark associated with the particular recorded media.

6. The television receiver of claim 1, wherein the operations further include:

outputting for presentation by the display device a third user interface that provides access to at least one item that, when selected, commands the television receiver to consecutively playback each of a plurality of clips of the particular recorded media, each clip associated with a particular bookmark.

7. The television receiver of claim 1, wherein receiving the list of generated bookmarks at the remote computer system causes the remote computer system to apply analytics against the list of generated bookmarks to identify probable interests of a subscriber associated with the television receiver and select the targeted advertisement based on the probable interests.

8. A method, comprising:

receiving, by a television receiver, a plurality of crowd-sourced bookmarks associated with a recording that is accessible to the television receiver;

receiving, by the television receiver during playback of the recording by the television receiver to a display device, input corresponding to selection of a command to access a particular crowd-sourced bookmark associated with the recording;

identifying, by the television receiver, a clip of the recording associated with the particular crowd-sourced bookmark, wherein a duration of the clip is user-configurable;

outputting, by the television receiver, the clip of the recording associated with the particular crowd-sourced bookmark to the display device for presentation thereon;

receiving input corresponding to creation of a new bookmark associated with the recording, wherein the input identifies an annotation for the new bookmark, wherein the input identifies a duration of a clip of the recording, and wherein the input identifies an identity parameter indicating that the new bookmark is to be shared anonymously;

updating a list of generated bookmarks with the new bookmark;

transmitting the list of generated bookmarks to a remote computer system;

receiving an advertising content package including a targeted advertisement associated with the list of generated bookmarks;

outputting, for presentation by the display device, an electronic programming guide including the targeted advertisement associated with the list of generated bookmarks; and receiving, by the television receiver, input corresponding to selection of a command for deletion of the new bookmark associated with the recording.

9. The method of claim 8, further comprising:

identifying, by the television receiver, a user-defined start time of the clip and a default end time of the clip so that the duration of the clip is a difference between the default end time and the user-defined start time.

10. The method of claim 8, further comprising:

identifying, by the television receiver, a default start time of the clip and a user-defined end time of the clip so that the duration of the clip is a difference between the user-defined end time and the default start time.

11. The method of claim 8, further comprising:
identifying, by the television receiver, a user-defined start time of the clip and a user-defined end time of the clip so that the duration of the clip is a difference between the user-defined end time and the user-defined start time.

12. The method of claim 8, further comprising:
identifying, by the television receiver, a default start time of the clip and a default end time of the clip so that the duration of the clip is a difference between the default end time and the default start time.

13. The method of claim 8, wherein receiving the list of generated bookmarks at the remote computer system causes the remote computer system to apply analytics against the list of generated bookmarks to identify probable interests of a subscriber associated with the television receiver and select the targeted advertisement based on the probable interests.

14. The method of claim 8, further comprising:
outputting, for presentation by the display device, a third user interface that provides access to a bookmark progress bar during playback of the clip of the recording associated with the particular crowd-sourced bookmark.

15. A method, comprising:
outputting, by a television receiver to a display device for presentation, a first user interface that provides a first activation item that, when selected, activates a service for bookmarking recorded media accessible to the television receiver, a second authorization item that, when selected, authorizes access to crowd-sourced bookmarks, and third authorization item that, when selected, authorizes sharing of particular bookmarks associated with recorded media by the television receiver with a remote computer system;
detecting input corresponding to selection of the second authorization item and the third authorization item;
outputting, by the television receiver to the display device for presentation, a second user interface that provides a first command item that when selected commands the television receiver to playback particular recorded media without access to bookmarks associated with the particular recorded media, and a second command item that when selected commands the television receiver to playback the particular recorded media with access to bookmarks associated with the particular recorded media;
detecting input corresponding to selection of the second command item;
outputting, by the television receiver to the display device for presentation, a playback of the particular recorded media with access to crowd-sourced bookmarks associated with the particular recorded media;
receiving input corresponding to creation of a new bookmark associated with the particular recorded media, wherein the input identifies an annotation for the new bookmark, wherein the input identifies a duration of a clip of the particular recorded media, and wherein the input identifies an identity parameter indicating that the new bookmark is to be shared anonymously;
updating a list of generated bookmarks with the new bookmark;
transmitting the list of generated bookmarks to the remote computer system;
receiving an advertising content package including a targeted advertisement associated with the list of generated bookmarks;
outputting, for presentation by the display device, an electronic programming guide including the targeted advertisement associated with the list of generated bookmarks; and
outputting, for presentation by the display device, an additional user interface that provides access to an item that, when selected, commands the television receiver to output to the display device another user interface that enables deletion of the new bookmark associated with the particular recorded media.

16. The method of claim 15, further comprising:
outputting, by the television receiver to the display device for presentation during playback of the particular recorded media, a third user interface that provides access to a third command item that, when selected, commands the television receiver to playback at least a particular clip of the particular recorded media that is associated with a particular bookmark; and
outputting, by the television receiver to the display device for presentation during playback of the particular recorded media, a fourth user interface that provides access to a fourth command item that, when selected, commands the television receiver to output to the display device another user interface that at least includes a description of content within the particular recorded media that is associated with a particular bookmark.

17. The method of claim 15, further comprising:
outputting, by the television receiver to the display device for presentation during playback of the particular recorded media, a third user interface that provides access to a third command item that, when selected, commands the television receiver to output to the display device a fourth user interface that enables addition of a new particular bookmark associated with the particular recorded media;
outputting, by the television receiver to the display device for presentation during playback of the particular recorded media, a fifth user interface that provides access to a fourth command item that, when selected, commands the television receiver to output to the display device a sixth user interface that enables definition of a new particular bookmark associated with the particular recorded media, wherein the definition includes a duration of a particular clip of the particular recorded media that is associated with a particular bookmark; and
outputting, by the television receiver to the display device for presentation during playback of the particular recorded media, a seventh user interface that provides access to a fifth command item that, when selected, commands the television receiver to output to the display device an eighth user interface that enables deletion of an existing particular bookmark associated with the particular recorded media.

18. The method of claim 15, further comprising:
outputting, by the television receiver to the display device for presentation during playback of the particular recorded media, a third user interface that provides access to a third command item that, when selected, commands the television receiver to communicate with a social networking service to transfer information to the social networking service that is associated with a particular bookmark associated with the particular recorded media; and
outputting, by the television receiver to the display device for presentation during playback of the particular recorded media, a fourth user interface that provides access to a fourth command item that, when selected, commands the television receiver to consecutively playback each of a plurality of clips of the particular recorded media, each clip associated with a particular bookmark.

19. The method of claim 15, wherein receiving the list of generated bookmarks at the remote computer system causes the remote computer system to apply analytics against the list of generated bookmarks to identify probable interests of a subscriber associated with the television receiver and select the targeted advertisement based on the probable interests.

20. The method of claim 15, further comprising:
   outputting, for presentation by the display device, a third user interface that provides access to a bookmark progress bar.

* * * * *